Aug. 21, 1934.  A. NOSAN  1,970,864
SAW TOOTH CUTTING AND SHARPENING MACHINE
Filed Aug. 25, 1933   6 Sheets-Sheet 5
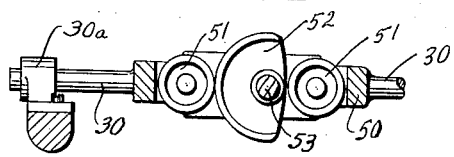
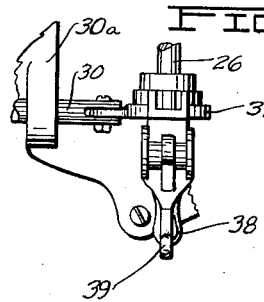
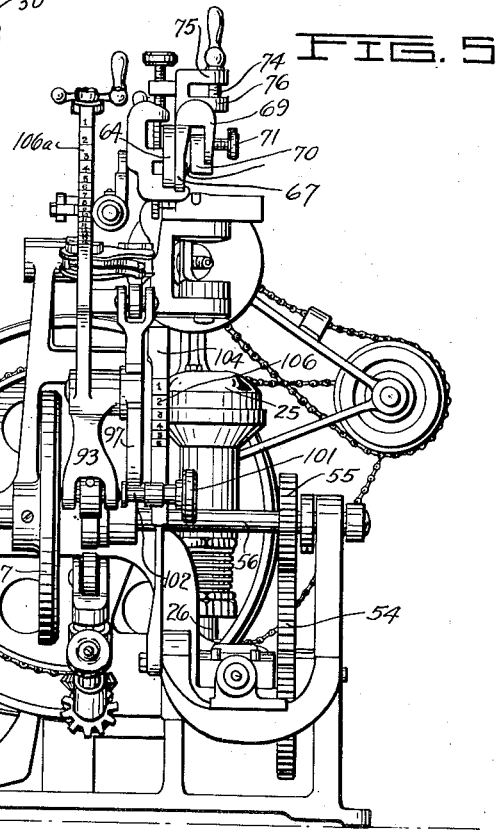
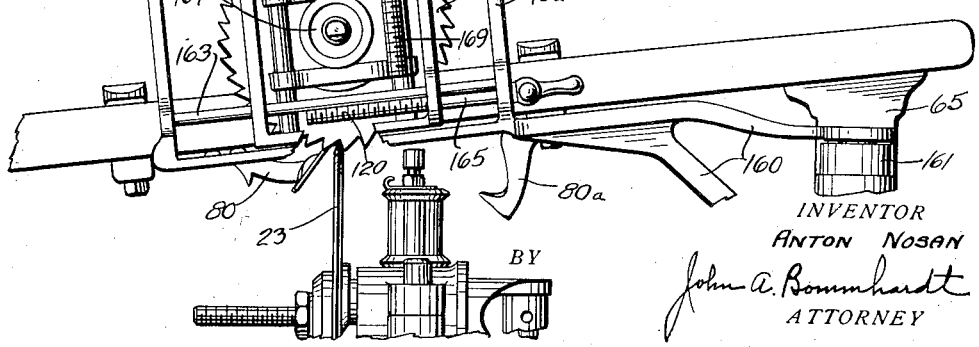
INVENTOR
ANTON NOSAN
John A. Bommhardt
ATTORNEY Aug. 21, 1934.　　　A. NOSAN　　　1,970,864
SAW TOOTH CUTTING AND SHARPENING MACHINE
Filed Aug. 25, 1933　　6 Sheets-Sheet 6
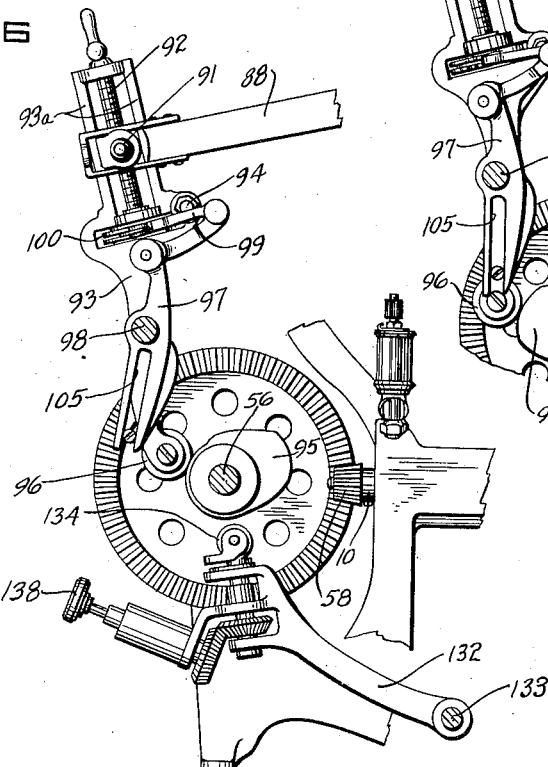
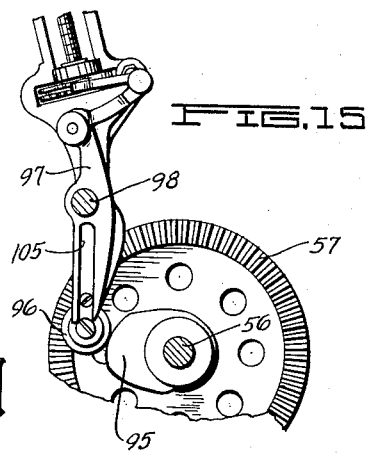
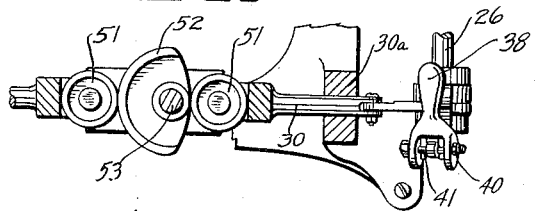
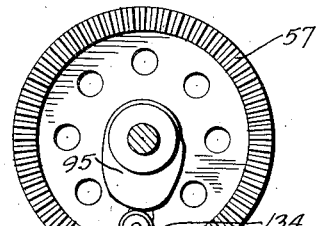
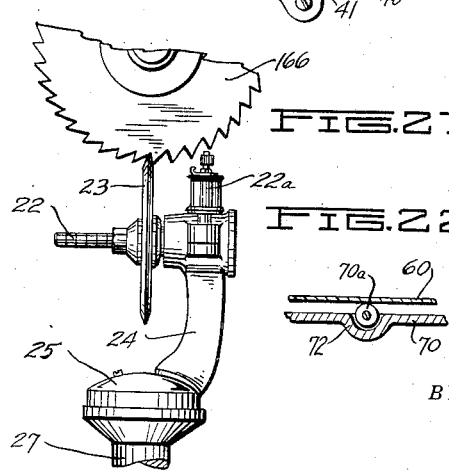
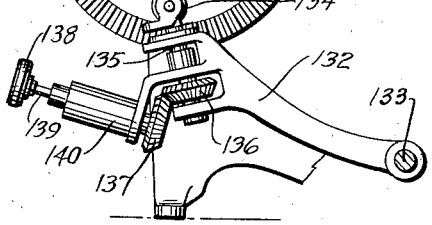
INVENTOR
ANTON NOSAN
BY John A. Bommhardt
ATTORNEY Patented Aug. 21, 1934

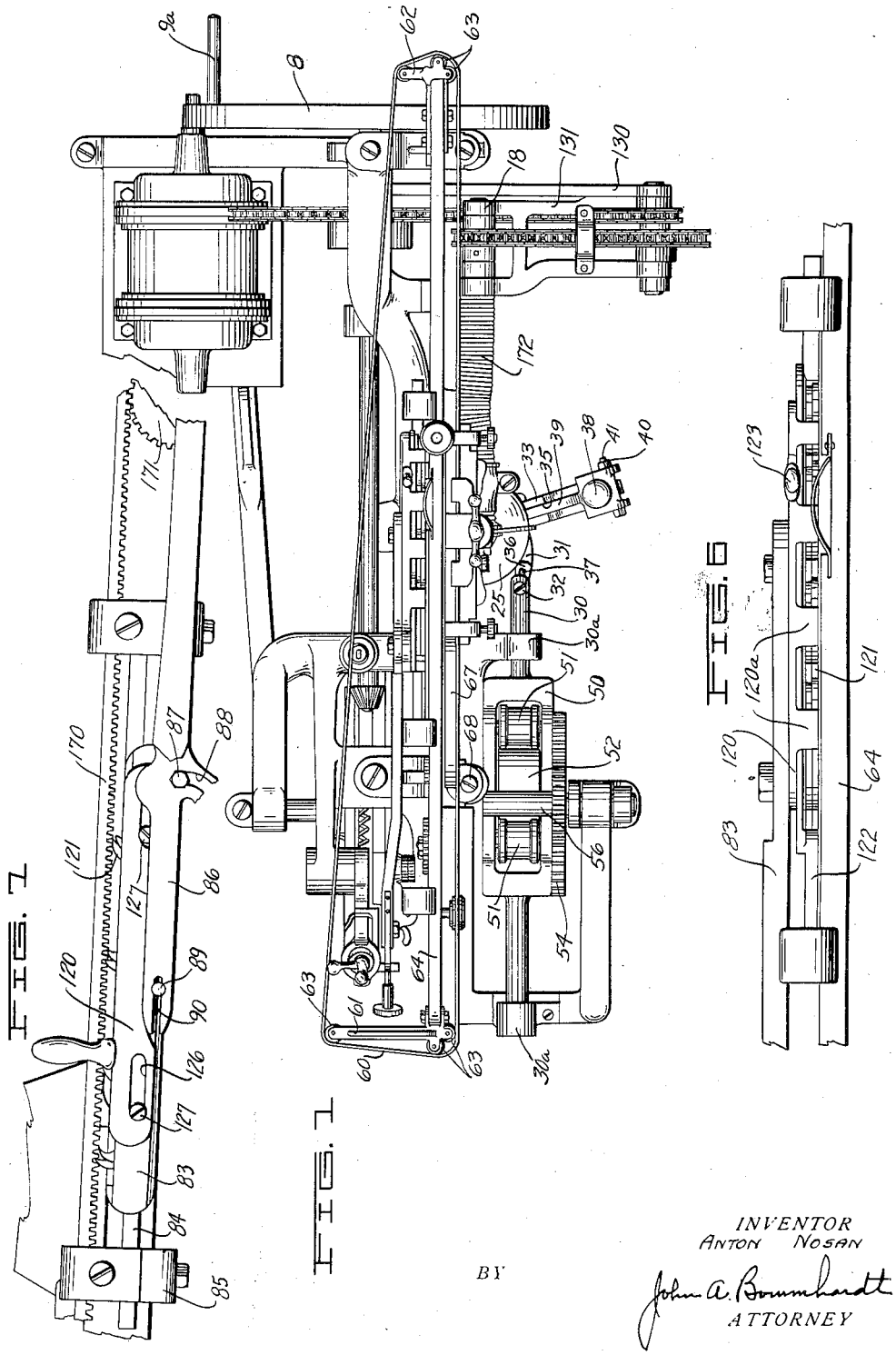

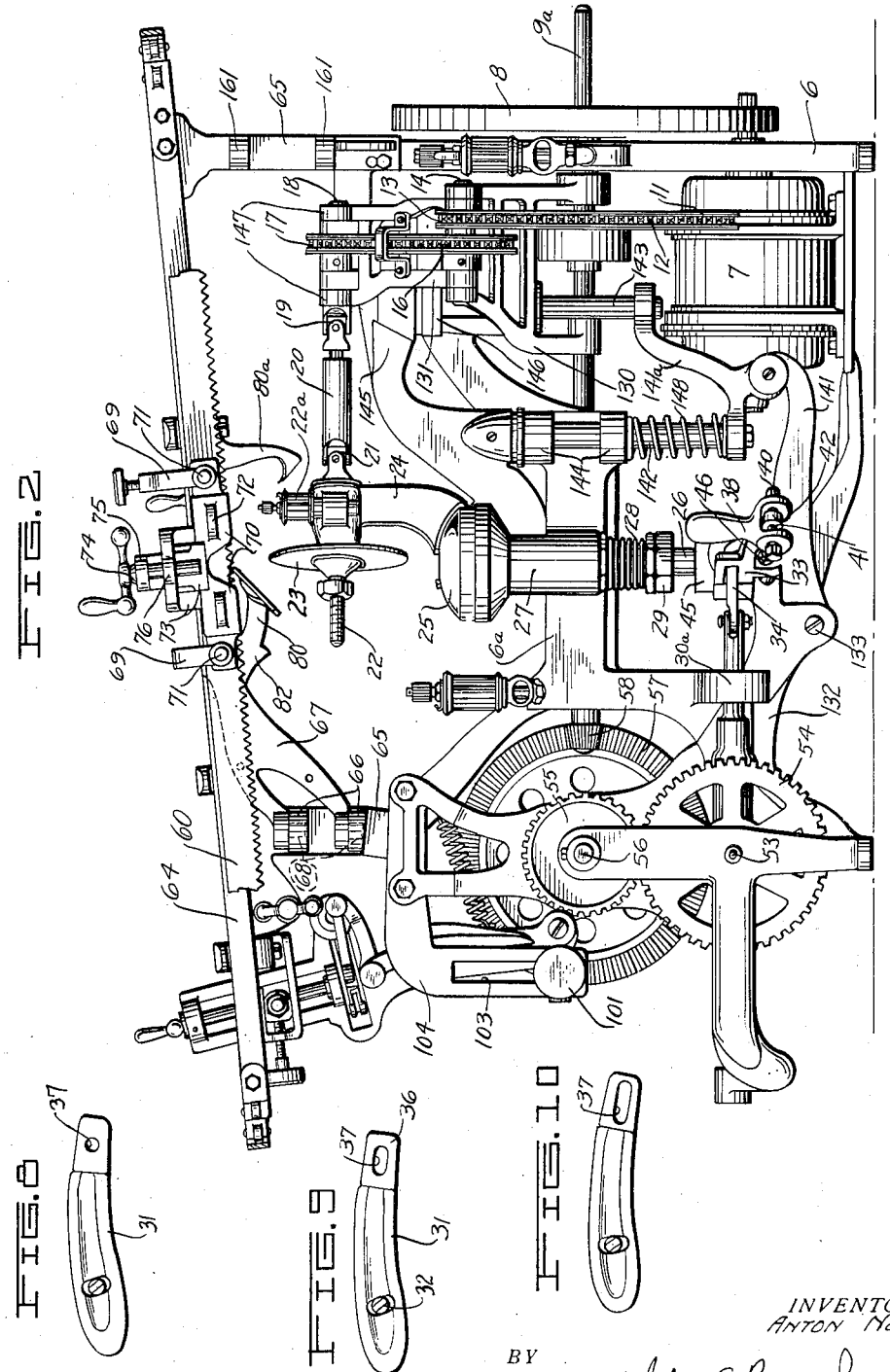

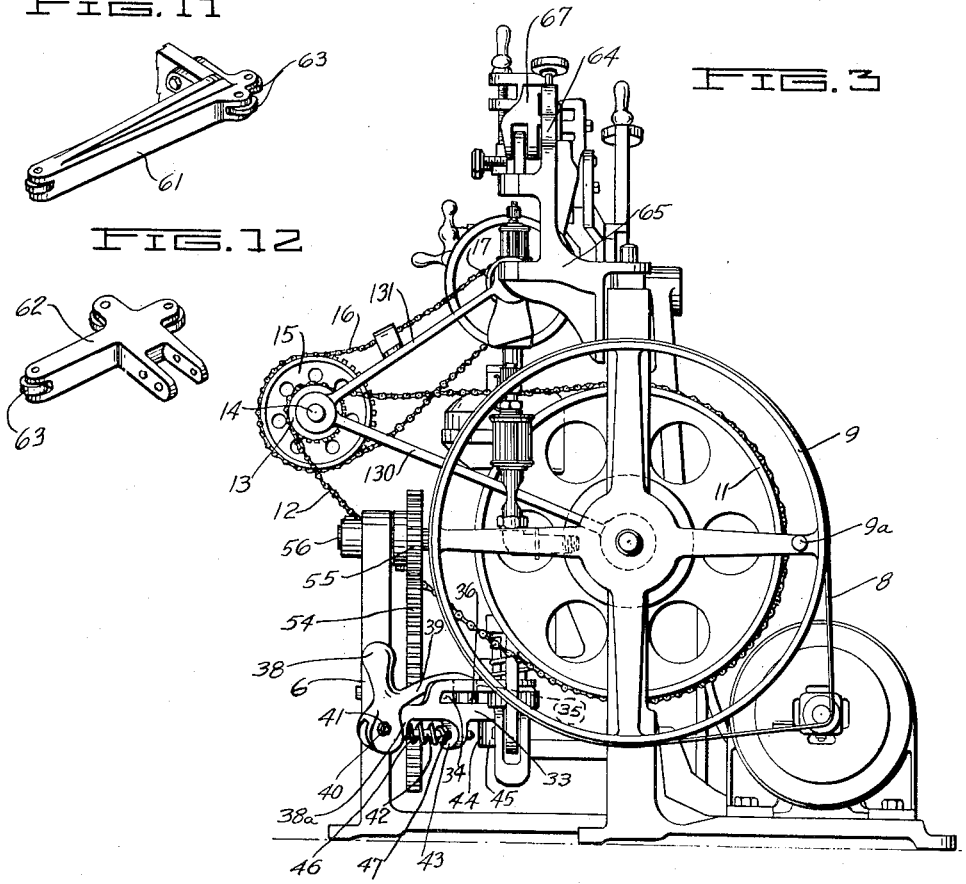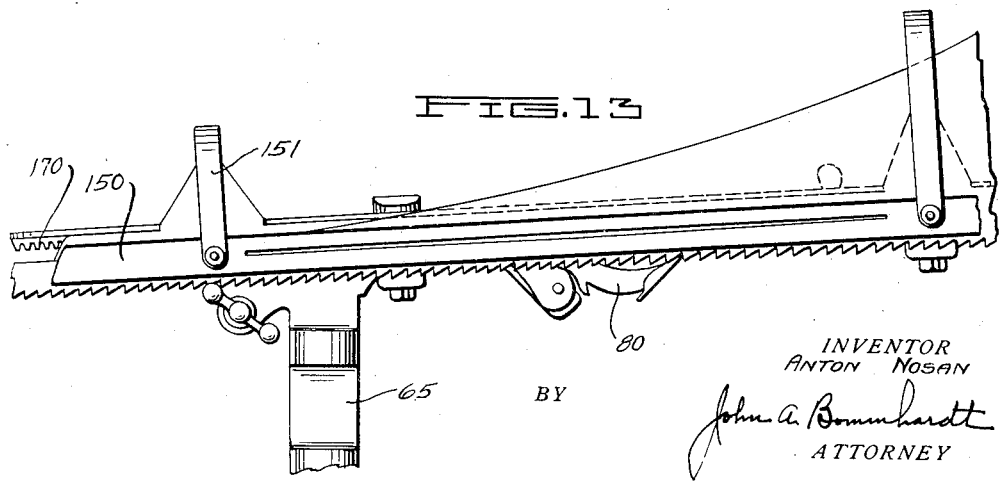

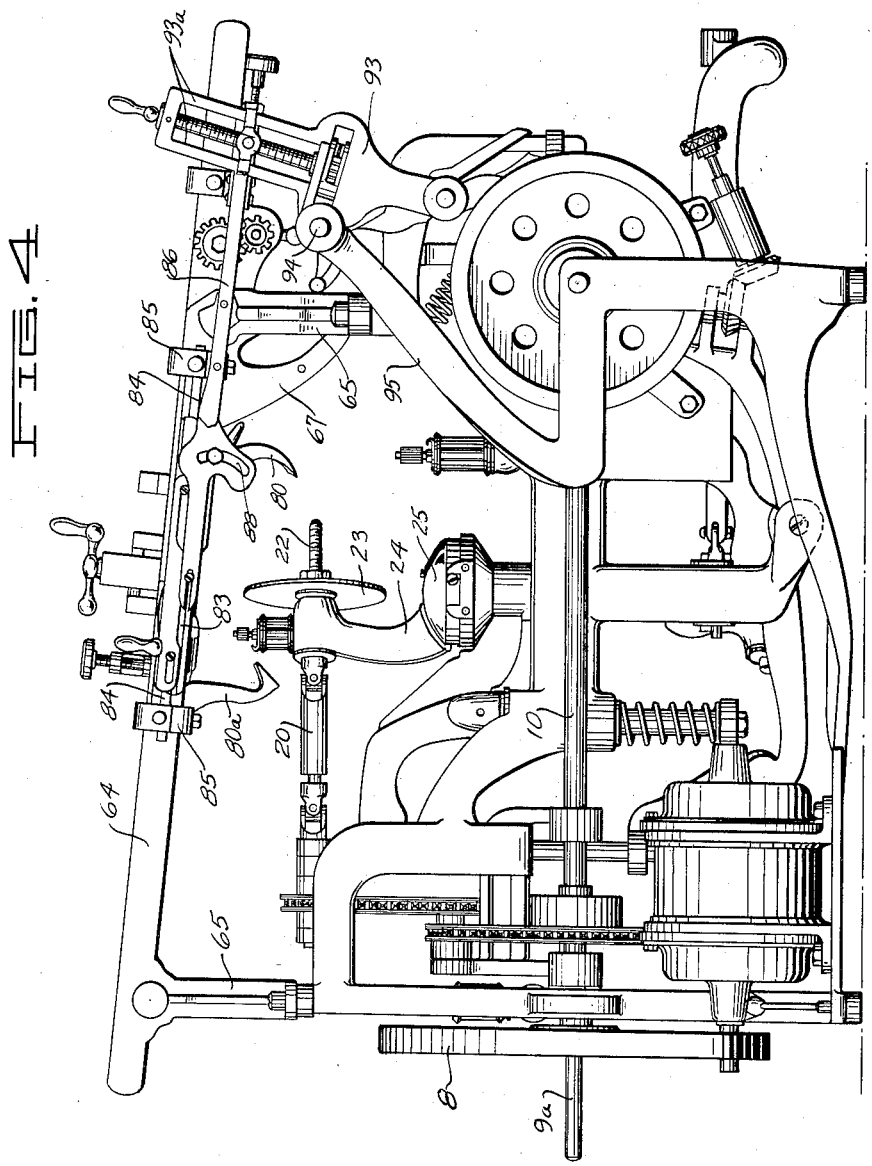

1,970,864

UNITED STATES PATENT OFFICE 1,970,864

SAW TOOTH CUTTING AND SHARPENING MACHINE

Anton Nosan, Cleveland, Ohio

Application August 25, 1933, Serial No. 686,675

10 Claims. (Cl. 76—41)

This invention relates to a machine for sharpening or cutting the teeth of saws, and it is applicable to saws of various kinds, such as band saws, hand saws and circular saws. As indicated it can be used to sharpen existing saws, or to cut new teeth in saw stock.

By means to be described adjustments may be made to vary the set and angle of the teeth, or to cut a series of teeth running from coarse to fine on the same saw.

Means are also provided for performing the various operations automatically, by means of motor driven devices which can be started and which will continue to operate until the work is done.

Various other objects and advantages will be apparent from the following specification and the accompanying drawings in which Fig. 1 is a top plan view of the machine. Fig. 2 is a front elevation. Fig. 3 is an elevation of the right hand end shown in Fig. 1. Fig. 4 is a rear elevation. Fig. 5 is a left hand end elevation. Fig. 6 is a detail in plan of devices for cutting new teeth. Fig. 7 is a side elevation of Fig. 6 reversed. Figs. 8, 9 and 10 are plan views of various forms of links for cutting or sharpening different sizes of teeth. Figs. 11 and 12 are details in perspective of guide brackets for band saws. Fig. 13 is a detail view of a clamp and feeding device for a band saw. Fig. 14 is a side elevation of an attachment for sharpening circular saws. Figs. 15, 16 and 17 are details of the feeding mechanism, in different positions. Fig. 18 is a detail in section of parts of the devices for oscillating the grinding wheel or file according to the angle of the teeth in cross-cut saws. Fig. 19 is a detail of another part of the same mechanism, in inactive position, as when sharpening a rip saw. Fig. 20 is a detail of the same mechanism in active position as when sharpening a cross-cut saw. Fig. 21 shows the grinding wheel or file applied to a circular saw. Fig. 22 is a detail in section.

The frame indicated at 6 is of a size and shape to support the parts hereinafter described. Power is shown derived from an electric motor 7 the shaft of which, by belt 8, drives pulley 9 on the main shaft 10 which extends lengthwise of the machine. Or the wheel 9 may be turned by a crank handle 9a. The rotation of the shaft 10 is transmitted by a sprocket 11 and chain belt 12 to a sprocket 13 on a short shaft 14, and by a sprocket 15 on said shaft by a chain belt 16 to a sprocket 17 on a shaft 18. The shaft 14 is supported by pivoted arms or frames 130 and 131 to be hereinafter described. Shaft 18 is mounted in bearings in a vertically movable frame to be described, and is connected by a universal joint 19 to a slip shaft section 20 (permitting longitudinal extension) and this section 20 is connected by another universal joint 21 to the shaft 22 which carries the grinding wheel or "file" 23. The grinding wheel may thus be driven at speed by the means described.

The shaft 22 turns in a bearing at the upper end of a bracket 24 which projects from a head 25 at the upper end of a shaft 26 which can be oscillated to turn the wheel 23 to the right or left according to the set of the teeth in a cross-cut saw for example. The shaft 26 can also be raised or lowered as will be hereinafter described. The shaft 26 is supported in bearings in a sleeve 27 mounted beside a fixed part 6a of the main frame. A spring 28 pressing against jam nuts 29 on the shaft 26, normally holds the shaft 26 and sleeve 27 in related position. 22a is an oil cup for the bearing of the shaft 22.

The means for oscillating the shaft 26, and consequently the wheel 23, comprise a rod 30 which reciprocates in guides 30a on the main frame and is connected at its inner end by a pivot pin 32 to one of the selected links 31 shown in Figs. 8, 9 and 10. The link is connected at its other end to a crank arm 33 which is splined on the lower end of the shaft 26. The crank arm 33 has a horizontal slot or recess 34 into which the nose or end 36 of the link 31 projects, and the crank arm also has a vertical hole or recess 35 which intersects the horizontal slot 34. The end 36 of the link 31 has a hole or slot 37 which as shown in Figs. 8, 9 and 10 may be of various lengths according to the throw or desired oscillation of the shaft 26. Connection between the link 31 and the crank arm 33 is effected by means of a latch 38 which has a depending finger 39 which when the latch is lifted, as shown in Figs. 2 and 3, drops through the hole 35 into the hole 37 and thereby connects the link 31 to the crank arm 33. When the latch lever is thrown down as shown in Fig. 19, the connection is broken, and the link 31 will move idly in the slot 34. The latch 38 is pivoted at 40 on a cross pin 41 projecting from the end of a lock pin 42 which extends through a guide 43 on the crank arm 33 and is arranged to engage at its inner end in a notch 44 in a part of the frame 45. A spring 46, is in compression between the guide 43 and a nut 47 on the pin 42. The latch 38 has a cam face or knuckle 38a, so that when it is tripped it will stay in position one way or the other by the pressure of the spring 46. When the pin 42 is engaged in the notch 44, as by throwing the latch handle 38 down, the crank arm 33 and shaft 26 are locked against oscillation, and the wheel 23 is held at a fixed angle, the finger 39, by the same action of the latch, being disengaged from the hole 37. When the latch handle is thrown up, as shown in Figs. 2 and 3, the finger 39 is engaged in the hole 37 and the pin 42 is disengaged from the notch 44, and consequently the shaft 46 and the grinding wheel 23 will be oscillated according to the reciprocation of the rod 30, the extent of this oscillation varying according to the length of the slot 37 in the selected link 31.

The rod 30 is formed with a yoke 50 carrying two rollers 51 between which operates a cam 52 mounted on a horizontal shaft 53 supported by the main frame, and this shaft 53 carries a gear wheel 54 meshing with a gear 55 on a shaft 56 which extends from front to rear and is supported by the main frame and which is driven (see Figs. 1 and 16) by a bevel gear 57 mounted thereon and a bevel pinion 58 on the inner end of the main shaft 10.

By the means just described, the wheel 23 can be oscillated more or less or allowed to remain at a fixed angle, according to the nature of the work in hand.

In Figs. 1 and 2 a band saw is shown. This saw 60 is looped around a pair of brackets 61 and 62 which carry rollers 63 over which the saw travels. The brackets 61 and 62 are fixed to opposite ends of a bridge or bar 64 which extends lengthwise of the machine and which is supported by depending legs 65 bolted on the main frame. One of the legs 65 has lugs 66 on which a clamp member 67 is mounted by pins 68 setting in holes in the lugs so that it can be lifted off when desired. The clamp 67 is formed with U-shaped arms 69 which overhang the saw. The front ends of these arms support a clamping plate 70, and the saw is confined or guided between the said plate and the main part of the member 67. The plate 70 is carried by screws 71 whereby it can be tightened more or less against the saw. The plate 70 has a pair of small rollers 70a confined in recesses 72 so that the rollers will press against the side of the saw 60, as shown in Fig. 22. The saw is backed while it is held in the clamp by a block 73 against which the back edge of the saw presses, and this block is adjustable by a handle and screw 74 which works through a bracket 75 on the clamping member and engages a threaded lug 76 on the plate 73. By adjusting the block, saws of different widths are accommodated.

The saw is fed tooth by tooth by means of a dog 80 which engages the teeth of the saw and is normally held against the saw by a spring 81 coiled around its pivot, but which can be held out of contact with the saw when desired, by a latch 82. The dog 80 is pivoted to a sliding plate 83 which is located on the inner side of the bridge 64, and has reduced ends 84 sliding in guides 85 fixed to the rear side of the bridge. The plate 83 is reciprocated by connection to a link rod 86 by means of a bolt 87 which extends through a curved slot 88 in the rod 86. One end of the rod 86 is guided by a pin 89 and slot 90. The other end of the rod 86 is pivoted to a nut block 91 (see Fig. 16) which travels on a screw 92 which can be turned to vary the throw of the feed according to the size of the teeth, this variation being permitted by the curved slot 88. The block 91 is carried between guides 93a forming part of an oscillating frame or arm 93 which is pivoted at 94 to an arm 95 forming a part of the frame of the machine. The rocking frame 93 is rocked by a cam 95 on the shaft 56 which engages a roller 96 at the lower end of the frame 93.

It will be seen that oscillation of the rocker frame 93 reciprocates the rod 86 and thereby the plate 83 which carries the dog 80, and thus the saw will be fed tooth by tooth.

It is sometimes desirable to operate on saws having teeth running from coarse to fine in the same saw. To permit the use of the machine on such saws I provide an automatic device in connection with the feed mechanism. This consists of a slotted lever 97 pivoted at 98 to the rocker frame 93 and carrying a pawl 99 which engages a ratchet 100 on the screw 92 so as to turn the screw while the machine is operating, and thereby vary the throw of the rocker. The extent of this variation is controlled by a set screw 101 formed with a pin 102 which can be mounted and set in a slot 103 in an arm 104 forming a part of the frame. This pin 102 will then engage in a slot 105 in the arm 97, and as the rocker arm 93 oscillates it carries with it the lever 97 the extent of movement of which is accordingly governed by the position of the pin 102 in the slot 105. A scale 106 is provided on the arm 104 to indicate the position of the pin 102 and accordingly the amount of variation at each operation of the lever, the motion of which is transmitted through the pawl 99 and ratchet 100 to the screw 92.

It is of course essential that the grinding wheel 23 be made to lift and drop as the saw is fed along and to do this I provide a lever 132 which is pivoted at 133 in the lower part of the fixed frame. This lever is rocked by the cam 95 (see Fig. 17) which acts against a roller 134 carried by the end of the lever 132. To vary the lift the roller is mounted on a screw 135 which extends through a gear nut 136 which may be turned by a gear 137 operated by a hand wheel 138 the shaft 139 of which extends through a bearing 140 supported by the lever 132. By turning the wheel 138 the throw of the lever 132 can be varied by setting the scale 106a according to the depth of the teeth to be cut. The other end of the lever is connected to a frame 141 with a pivoting forked arm 141a guided by rods 142 and 143, the former moving in guides 144 projecting from the fixed frame portion 6a and carrying at its upper end a beam or bar 145 connected to a slide 146 which carries the bearings 147 for the shaft 18. The beam or bar 145 is also attached to the sleeve 27. The lift of the lever 132 produced by the cam 95 as shown in Fig. 17 therefore raises the frame 141, the rod 142, the beam 145 and the parts carried thereby to lift the wheel 23 to contact with the saw as each tooth is advanced to position. A spring 148 returns the parts after each lift.

For sharpening a hand saw the brackets 61 and 62, may be removed from the bridge and also the clamp and other parts supported by the bracket 67, and a simple form of clamp substituted as shown in Fig. 13 consisting of a guide bar 150 carried by overhanging arms 151 attached to the bridge, the same form of feeding device including a dog 80 being used.

To locate the saw exactly in its proper position with respect to the grinding wheel I provide a rack 170, shown in Figs. 7 and 13 which is fixed to the bar 150 and is engaged by a pinion 171 which is mounted on a projection from the bridge 64 and which can be turned by hand to shift the guide bar and the saw engaged by the clamp, to exactly position the saw with respect to the wheel. This can be used also in cutting new teeth in saws.

For a circular saw the band saw devices are removed and the parts shown in Fig. 14 substituted. These comprise a bracket 160 supported by lugs 161 on one of the legs 65 and said bracket supports a frame 162 having guide rods 163 upon which is slidably mounted a sub-frame 164 which can be adjusted by a screw 165 to vary the position of the teeth of the saw 166 with respect to the grinding wheel 23 so as to grind either undercut teeth of V-shaped teeth. The saw is mounted on a boxing 167 carried by a minor frame 168 which is adjustable by a screw 169 and handle 170 to vary the distance of the boxing so as to accommodate circular saws of various diameters.

It is sometimes desirable to cut entirely new teeth in a saw and for this purpose I employ a supplemental slide 122 located between the bridge 64 and the slide bar 83, and this plate 122 has pivoted thereto several sets of dogs 121 which normally are passed up by springs so that they will engage the plain edge of the blade being cut with sufficient friction to step it along. These dogs may be thrown out of action, in ordinary operation, by a slide 120, operated by handle 123, and having projections 120a which when the plate 120 is shifted by the handle will press the dogs 121 down out of action, and hold them so. The movement of the plate 120 is guided by guide 126 and screws 127.

For some purposes I may also employ a supplemental or pulling dog 80a operated by the slide plate 83 and which may be snapped up or down into or out of engagement with the saw teeth and so used instead of the ordinary dog 80.

A flexible coupling 172, as shown in Fig. 1, may be used in place of shaft 18, universal joints 19 and 21, and shaft section 20.

I claim:

1. In a saw sharpening machine the combination of a frame, a bridge supported at its opposite ends on the frame and extending across and above the frame, means to guide a straight saw along the bridge with its teeth presented downwardly, means to feed a saw in the guide, a rotary grinding wheel to operate on the saw, and means to raise and lower the wheel to and from the saw.

2. The combination stated in claim 1, and means to automatically oscillate the wheel to operate on teeth at different angles.

3. The combination stated in claim 1, the means to feed the saw including a reciprocating bar and a dog carried thereby engageable with the saw teeth.

4. The combination stated in claim 1, and means to operate the feed and the lift and drop of the wheel, comprising a shaft and a single cam thereon operating both of said means.

5. In a saw feeding device for a saw sharpening machine, the combination of a rocker, means connected thereto to feed the saw, and means to vary the effective throw of the rocker while it is in operation, said means including a screw carried by the rocker, a lever pivoted on the rocker, a pawl and ratchet device carried by the rocker between the lever and the screw, and a settable actuating pin mounted on the frame of the machine and engageable with the lever to vary its throw.

6. In a saw sharpening machine, the combination of a saw guide, a rotary grinding wheel movable up and down to and from the saw, a flexible shaft on which the wheel is mounted, an oscillating support for said shaft, and means to move said support and shaft up and down, and means to rotate the shaft, the means to rotate the shaft being extensible to accommodate the up and down movement.

7. The combination stated in claim 6, the extensible means including belt gearing and a jointed frame supporting said gearing.

8. The combination stated in claim 6, the extensible means including a jointed frame consisting of two sections pivoted together and a shaft at the joints, and belts between the respective shafts.

9. In a saw sharpening machine, the combination of a saw guide, a reciprocating saw feeding bar, a rocker, a connecting rod between the rocker and the bar, the connecting rod being adjustable with respect to the rocker to vary the stroke of the bar, and means to automatically vary the adjustment while the rocker is in operation to act on teeth running from coarse to fine.

10. The combination with means to guide and feed a saw, of a rotary grinding wheel movable to and from the saw, and means to oscillate the wheel comprising a rock shaft supporting the wheel shaft, a reciprocating rod, a crank connection between the rod and the rock shaft, the connection between the rod and the crank including a latch which may be engaged or disengaged, and a locking pin operated by the latch and arranged to prevent movement of the rock shaft when the latch is disengaged.

ANTON NOSAN.